United States Patent
Knapke et al.

(10) Patent No.: US 9,370,974 B2
(45) Date of Patent: Jun. 21, 2016

(54) ASSEMBLY FOR A TIRE INFLATION SYSTEM

(71) Applicant: Dana Heavy Vehicle Systems Group, LLC, Maumee, OH (US)

(72) Inventors: Brian V. Knapke, Toledo, OH (US); Lloyd G. Racine, Center, ND (US); Blake T. Garretson, Liberty Center, OH (US); Scott V. Anderson, Paw Paw, MI (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 66 days.

(21) Appl. No.: 14/204,055

(22) Filed: Mar. 11, 2014

(65) Prior Publication Data
US 2014/0261941 A1    Sep. 18, 2014

Related U.S. Application Data

(60) Provisional application No. 61/786,949, filed on Mar. 15, 2013, provisional application No. 61/818,480, filed on May 2, 2013.

(51) Int. Cl.
*B60C 23/10* (2006.01)
*B60C 23/00* (2006.01)

(52) U.S. Cl.
CPC .................................. *B60C 23/003* (2013.01)

(58) Field of Classification Search
CPC .. B60C 23/003; B60C 23/004; B60C 23/005; B60C 23/10
USPC ........................................ 152/417, 416, 415
See application file for complete search history.

(56) References Cited

U.S. PATENT DOCUMENTS

| | | | | |
|---|---|---|---|---|
| 1,112,596 | A * | 10/1914 | Burggraf | 152/417 |
| 4,282,949 | A * | 8/1981 | Kopich et al. | 180/252 |
| 4,492,019 | A * | 1/1985 | Wells et al. | 152/417 |
| 4,932,451 | A * | 6/1990 | Williams et al. | 152/417 |
| 5,174,839 | A | 12/1992 | Schultz | |
| 5,203,391 | A | 4/1993 | Fox | |
| 5,236,028 | A | 8/1993 | Goodell | |
| 5,287,906 | A | 2/1994 | Stech | |
| 5,377,736 | A | 1/1995 | Stech | |
| 5,429,167 | A | 7/1995 | Jensen | |
| 5,868,881 | A | 2/1999 | Bradley | |
| 5,979,526 | A | 11/1999 | Chamoy | |
| 6,105,645 | A | 8/2000 | Ingram | |
| 6,145,559 | A * | 11/2000 | Ingram, II | 152/417 |
| 6,260,595 | B1 | 7/2001 | Cobb | |
| 6,269,691 | B1 | 8/2001 | Sowatzke | |
| 6,283,186 | B1 * | 9/2001 | Krisher | 152/417 |
| 6,334,791 | B1 | 1/2002 | Yeh | |
| 6,425,427 | B1 | 7/2002 | Stech | |
| 6,435,238 | B1 | 8/2002 | Henning | |

(Continued)

FOREIGN PATENT DOCUMENTS

WO        2004080729 A2      9/2004

*Primary Examiner* — Hau Phan
(74) *Attorney, Agent, or Firm* — Mashall & Melhorn, LLC

(57) ABSTRACT

An assembly includes a rotary joint spindle and a rotary joint body rotatably disposed on and in fluid communication with the rotary joint spindle. The rotary joint body is housed by a hub cap and provided adjacent an end of a spindle. A pressure relief valve is disposed between the hub cap and the rotary joint body. The pressure relief valve selectively provides a seal between the hub cap and the rotary joint body.

20 Claims, 6 Drawing Sheets

(56) References Cited

U.S. PATENT DOCUMENTS

| | | |
|---|---|---|
| 6,439,044 B1 | 8/2002 | Tigges |
| 6,484,774 B1 | 11/2002 | Naedler |
| 6,698,482 B2 | 3/2004 | Henning |
| 6,871,683 B2 | 3/2005 | Cobb |
| 7,185,688 B2 | 3/2007 | Hayes |
| 7,207,365 B2 * | 4/2007 | Nelson et al. ............ 152/417 |
| 7,302,979 B2 | 12/2007 | Davison |
| 7,306,020 B2 | 12/2007 | Beverly |
| 7,896,045 B2 * | 3/2011 | Solie et al. ............ 152/417 |
| 7,963,159 B2 | 6/2011 | Ingram |
| 7,967,045 B2 | 6/2011 | Jenkinson |
| 8,051,940 B2 * | 11/2011 | Ziech ............ 180/253 |
| 8,069,890 B2 | 12/2011 | Resare |
| 8,505,600 B2 * | 8/2013 | Padula et al. ............ 152/417 |
| 2009/0283190 A1 | 11/2009 | Padula |
| 2012/0024445 A1 | 2/2012 | Wilson |

\* cited by examiner

ASSEMBLY FOR A TIRE INFLATION SYSTEM

CROSS-REFERENCE TO RELATED APPLICATIONS

This application is claiming the benefit, under 35 U.S.C. 119(e), of the provisional applications which were granted Ser. No. 61/786,949 filed on Mar. 15, 2013 and Ser. No. 61/818,480 filed on May 2, 2013, the entire disclosures of which are hereby incorporated by reference.

BACKGROUND OF THE INVENTION

The invention relates to an assembly for a vehicle. More particularly, the invention relates to an assembly for use in vehicle tire inflation system.

Tire inflation systems for vehicles are used to provide a vehicle with the versatility to maneuver over differing terrain types and to reduce maintenance requirements. For example, one or more wheel assemblies in fluid communication with a tire inflation system may have a tire pressure which can be lowered to provide additional traction for the vehicle or raised to reduce the rolling resistance and increase the fuel efficiency of the vehicle. Additionally, utilizing the tire inflation system may eliminate the need to periodically check and adjust the tire pressure within each wheel assembly in communication with the system.

Tire inflation systems often employ a rotary joint to allow the rotating portions and non-rotating portions of the vehicle to communicate pressurized fluid effectively. Pressure can build adjacent the rotary joint because of temperature changes and/or churning of lubricant. It is preferable to vent the pressure without allowing the lubricant to escape. If the pressure is not vented or the lubricant escapes a failure in or near the tire inflation system can occur.

Thus, it would be desirable to provide an assembly that allows the rotating and non-rotating portions of the tire inflation system to communicate, allows pressure adjacent the assembly to be vented and prevents lubricant from escaping when the pressure is being vented.

BRIEF SUMMARY OF THE INVENTION

Embodiments of an assembly are provided.

In an embodiment, the assembly comprises a rotary joint spindle. A rotary joint body is rotatably disposed on and in fluid communication with the rotary joint spindle. The rotary joint body is housed by a hub cap and provided adjacent an end of a spindle. A pressure relief valve is disposed between the hub cap and the rotary joint body. The pressure relief valve selectively provides a seal between the hub cap and the rotary joint body.

In another embodiment, the assembly comprises a rotary joint spindle which is attached to a spindle and in fluid communication with a spindle air passage formed in the spindle. A rotary joint body is provided adjacent an end of the spindle and rotatably disposed on and in fluid communication with the rotary joint spindle. A rotary seal assembly seals against an inner surface of the rotary joint body and is disposed around a second outer diameter portion of the rotary joint spindle. A pressure relief valve is separated from the rotary seal assembly by the rotary joint body and disposed between a hub cap and the rotary joint body. The pressure relief valve selectively provides a seal between the hub cap and the rotary joint body. A bolt is concentric with the pressure relief valve and in fluid communication with the rotary joint spindle via a chamber formed in the rotary joint body.

BRIEF DESCRIPTION OF THE DRAWINGS

The above will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Embodiments of an assembly 10 are described herein. The assembly 10 will be described in connection for use with a tire pressure management system or tire inflation system. Preferably, the tire inflation system is a central tire inflation system. Central tire inflation systems are known and are utilized in inflating, deflating and maintaining the tire pressure of one or more wheel assemblies (not depicted) attached to a vehicle (not depicted).

It would be understood by one of ordinary skill in the art that the various embodiments of the assembly 10 described herein may have applications to commercial and off-highway vehicles. Furthermore, it would be understood by one of ordinary skill in the art that the aforementioned embodiments could have industrial, locomotive, military and aerospace applications.

Embodiments of the assembly 10 are preferably used with a steer axle assembly. A portion of an embodiment of a steer axle assembly suitable for use with the assembly 10 is shown best in FIG. 1. However, it should be appreciated that the assembly and/or certain portions thereof may be used apart from a steer axle assembly. For example, in certain embodiments (not depicted), the assembly and/or certain portions thereof may be used with both driven and undriven non-steering axle assemblies.

Figure 1:
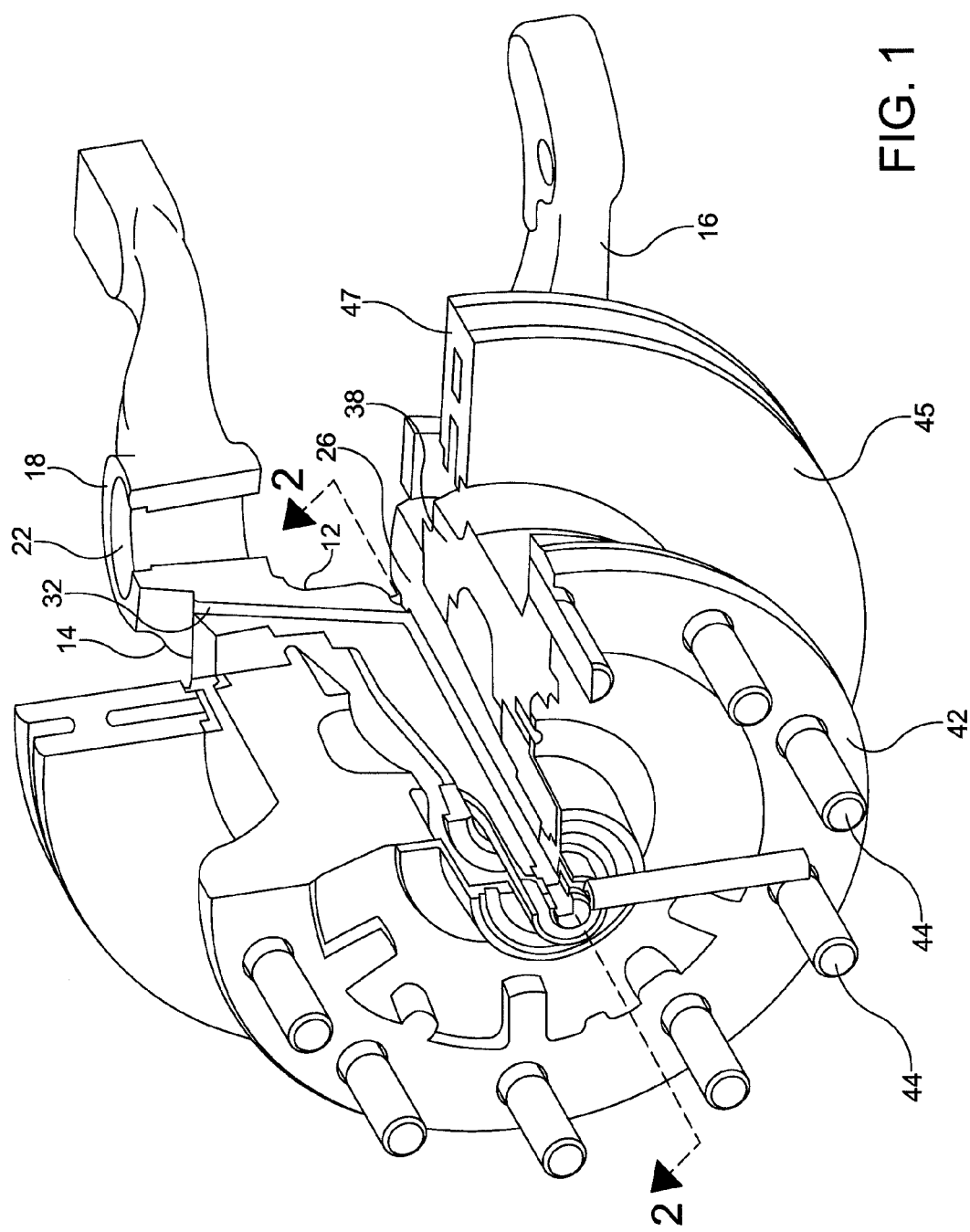
FIG. 1 is a partially-sectioned perspective view of a portion of a steer axle assembly which illustrates an embodiment of an assembly in accordance with the invention.
Figure 2:
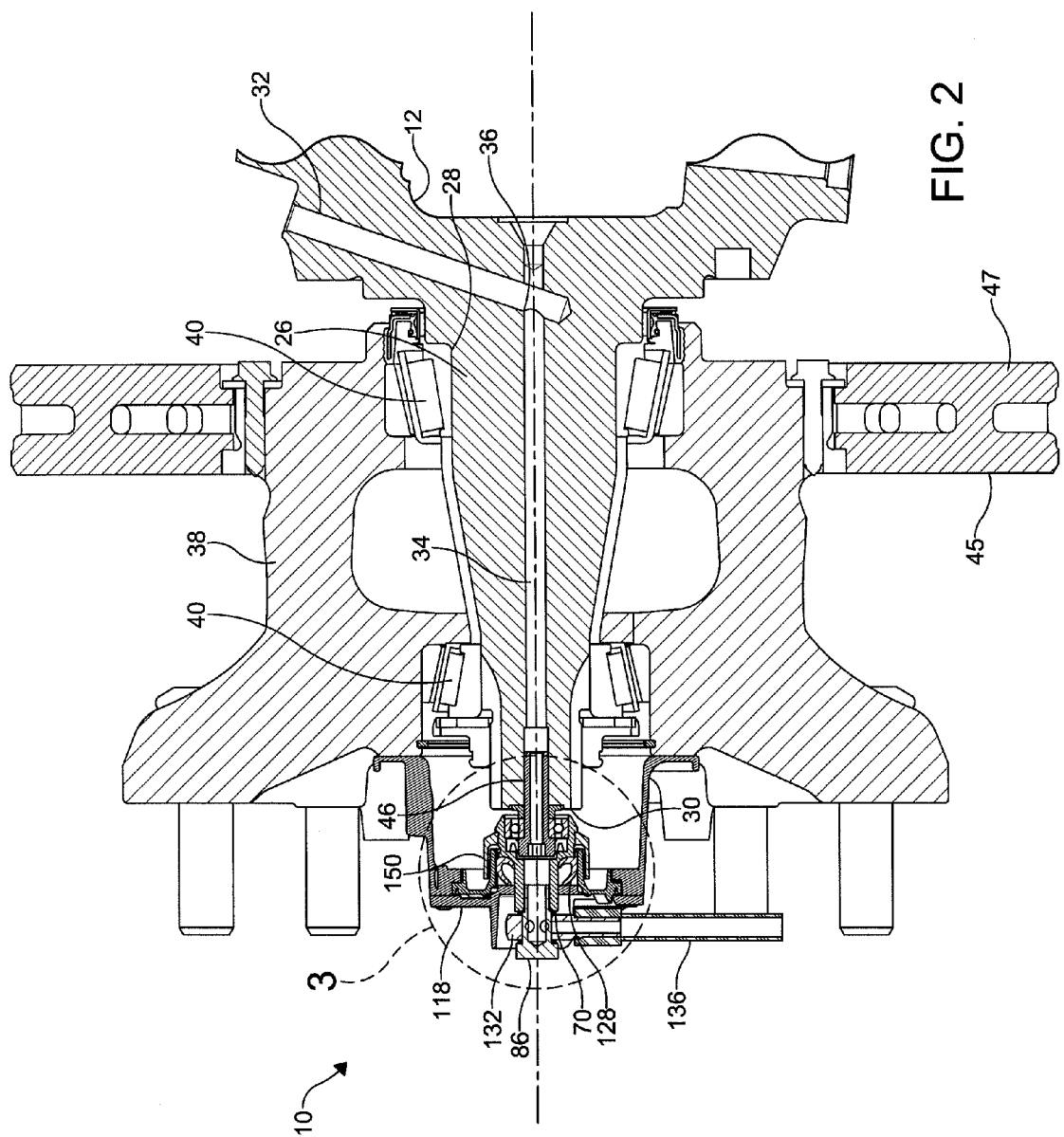
FIG. 2 is cross-sectional view of an outboard end of the portion of the steer axle assembly of FIG. 1 taken along line 2-2.

Referring now to FIGS. 1 and 2, the steer axle assembly comprises a steer axle (not depicted) having an outboard end. The outboard end has a king pin bore extending therethrough.

A knuckle 12 is located adjacent the outboard end of the steer axle. The knuckle 12 has an upper portion 14 and lower portion 16. The upper portion 14 defines an upper king pin boss 18 and the lower portion 16 defines a lower king pin boss (not depicted). The bosses are generally vertically aligned with one another. An upper bore 22 extends through the upper king pin boss 18 and a lower bore extends through the lower king pin boss. The boss bores are aligned with the king pin bore.

The upper bore 22, the lower bore and the king pin bore receive a king pin (not shown) therethrough. Bearings may be located within the bores to pivotally support the king pin therein. The king pin pivotally connects the knuckle 12 with the steer axle.

A spindle 26 is attached to the knuckle 12. The spindle 26 is a cone-shaped structure extending from the knuckle 12 in an outboard direction. In the depicted embodiment, the spindle 26 tapers downwardly from an inboard side 28 adjacent the king pin to an outboard side 30. One or more steer arms or other suspension component connections portions may also be attached or connected to the knuckle 12.

A knuckle air passage 32 extends through the knuckle 12. In FIG. 1, the knuckle air passage 32 begins adjacent the upper king pin boss 18. The passage 32 extends toward the spindle 26 at a downward angle. While one passage through the spindle 26 is depicted, it can be appreciated that other passages at different angles or locations can be located in the spindle 26. The number of passages can also vary.

The knuckle air passage 32 intersects and is in fluid communication with a spindle air passage 34. Preferably, the knuckle air passage 32 intersects the spindle air passage 34 adjacent a first end 36 thereof. In the embodiments illustrated, the knuckle air passage 32 is provided in a substantially perpendicular relationship with the spindle air passage 34.

The spindle air passage 34 extends in an outboard direction through the spindle 26. As shown best in FIG. 2, the spindle air passage 34 extends along a longitudinal axis of the spindle 26. The spindle air passage 34 may be of a diameter which is substantially constant.

A hub 38 is rotatably mounted on and concentric with the spindle 26. Bearings 40 are located between the hub 38 and spindle 26 to permit the hub 38 to rotate with respect to the spindle 26. The hub 38 has a fastener flange 42. Fasteners 44 are located through the fastener flange 42 for connecting the hub 38 to a wheel assembly (not depicted). The hub 38 may also have a braking surface 45 attached thereto. As illustrated best in FIGS. 1 and 2, the braking surface is provided as a portion of a brake rotor 47. The brake rotor 47 is attached to the hub 38 and located on the hub 38 inboard of the fasteners 44.

Figure 3:
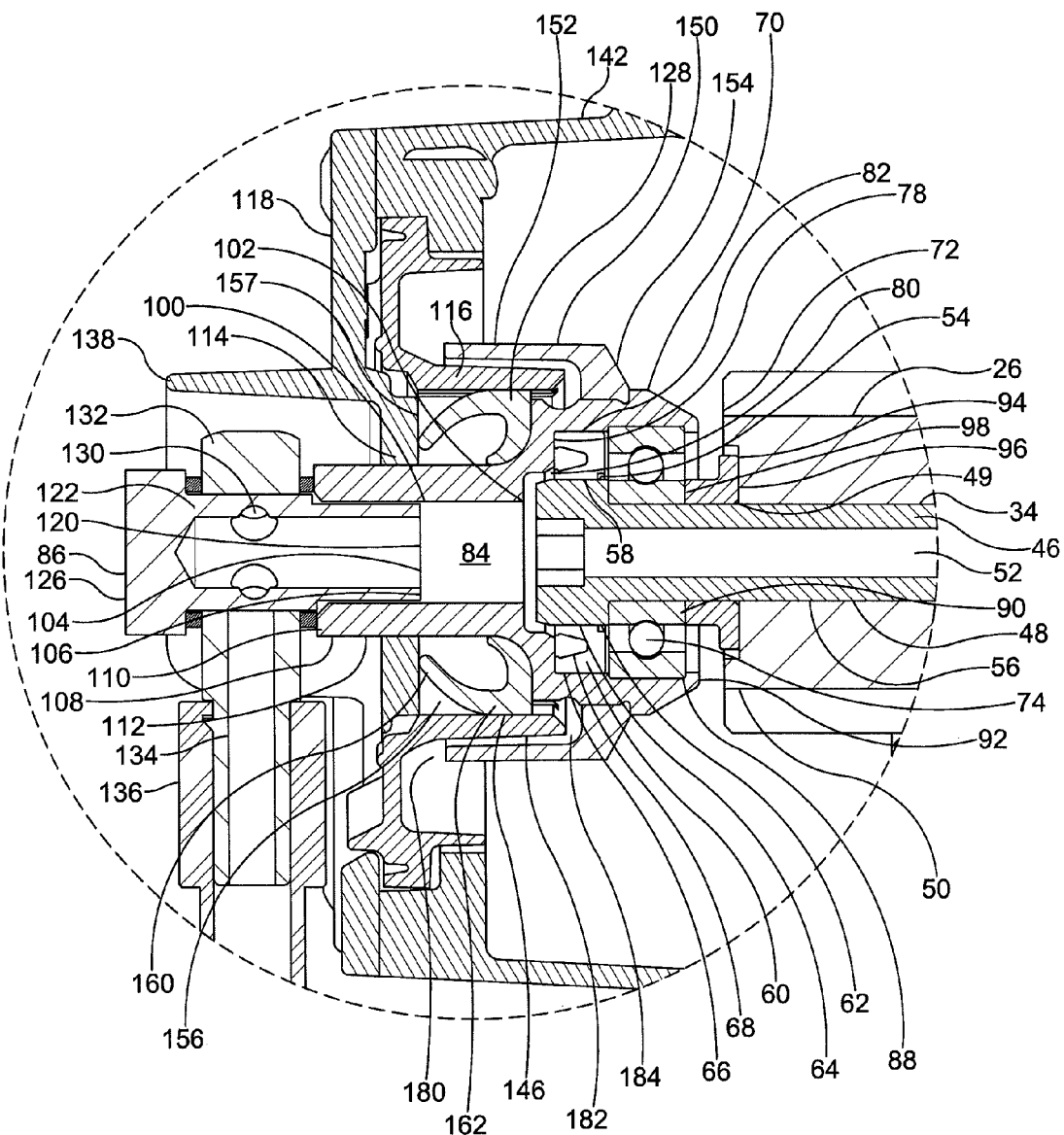
FIG. 3 is an enlarged view of a portion of FIG. 2.

Referring now to FIGS. 2 and 3, a rotary joint spindle 46 is attached to the spindle 26. Adjacent a second end 49 of spindle air passage 34, an inboard portion 48 of the rotary joint spindle 46 is located within the spindle air passage 34. More particularly, the inboard portion 48 is located in the spindle air passage 34 at an outboard end portion 50 of the spindle 26.

The rotary joint spindle 46 has an air passage 52 which is continuous and extends from the inboard portion 48 to an outboard portion 54. The passage 52 is air tight and in fluid communication with and longitudinally aligned with the spindle air passage 34. In an embodiment, the passage 52 is of a substantially constant diameter in the inboard portion 48 and increases in diameter in the outboard portion 54.

The inboard portion 48 comprises a first outer diameter portion 56 and the outboard portion 54 comprises a second outer diameter portion 58. The second outer diameter portion 58 is of a diameter which is greater than that of the first outer diameter portion 56.

A rotary seal assembly 60 is located on an inboard portion 62 of the second outer diameter portion 58. The rotary seal assembly 60 prevents, or reduces, air leakage into an area between the spindle 26 and the hub 38. The rotary seal assembly 60 comprises an inner diameter surface 64, an outer diameter surface 66 and a groove 68 between the two surfaces 64, 66. The rotary seal assembly 60 is disposed around the second outer diameter portion 58 of the rotary joint spindle 46 such that the inner diameter surface 64 is in direct contact with the second outer diameter portion 58.

The groove 68 faces an outboard direction. A biasing member (not depicted) may be located within the groove 68. In certain embodiments, the biasing member is a spring. In these embodiments, the spring is a circular spring such as a garter spring. In other embodiments, the biasing member is a V-shaped serrated ring. The ring is preferably flexible and metallic. The biasing member biases the rotary seal assembly 60 into engagement with the second outer diameter portion 58 so that the rotary seal assembly 60 seals against the rotary joint spindle 46.

A rotary joint body 70 is provided adjacent an end 72 of the spindle 26 and rotatably disposed on the rotary joint spindle 46 via a bearing 74. The rotary joint body 70 is a hollow body and the rotary joint spindle 46 extends into an interior of the rotary joint body 70. The outboard portion 54 of the rotary joint spindle 46 is located adjacent a radially inward extending flange 78 of the rotary joint body 70. Preferably, the rotary joint spindle 46 and the rotary joint body 70 are not in direct contact with one another and are separated from one another by a gap 80.

The rotary joint spindle 46 and the rotary joint body 70 are in fluid communication. As stated above, the rotary seal assembly 60 seals against the rotary joint spindle 46. The rotary seal assembly 60 also seals against the rotary joint body 70. More particularly, the rotary seal assembly 60 seals against an inner surface 82 of the rotary joint body 70. The rotary seal assembly 60 prevents, or reduces, air from leaking from a chamber 84 formed in the rotary joint body 70 positioned between the rotary joint spindle 26 and a bolt 86.

The rotary joint body 70 is at least partially concentric with and partially houses the rotary joint spindle 46. The rotary joint body 70 also houses the rotary seal assembly 60 and the bearing 74. The bearing 74 is located between the inner surface 82 of the rotary joint body and the first outer diameter portion 56 of the rotary joint spindle 46 to permit the rotary joint body 70 to rotate with respect to the rotary joint spindle 46. The bearing 74 has an outer race 88 in direct contact with the inner surface 82 of the rotary joint body 70 and an inner race 90 in direct contact with the first outer diameter portion 56 of the rotary joint spindle 46. The rotary joint body 70 may have a crimped portion 92 provided over the outer race 88 to retain it in place.

The inner race 90 abuts, on one side, the second outer diameter portion 58 of the rotary joint spindle 46. The other side of the inner race 90 abuts against a spacer 94. The spacer 94 separates the bearing 74 from the end 72 of the spindle 26 and is disposed around the rotary joint spindle 46. More particularly, the spacer 94 has an inboard portion 96 and an outboard portion 98. The inboard portion 96 is located adjacent to the outer race 88 on one side and the end 72 of the spindle 26 on the other side. The outboard portion 98 directly abuts the inner race 90.

The inner surface 82 of the rotary joint body 70 generally decreases in diameter in an outboard direction. The chamber 84 is provided in a reduced diameter portion 100 of the inner surface 82. The chamber 84 has a substantially constant diameter and is in fluid communication with the rotary joint spindle 46 on an end 102 and an open end 104 of the bolt 86 on an opposite end 106.

The rotary joint body has an outer surface 108. The outer surface 108 adjacent an outboard end portion 110 of the rotary joint body 70 is multi-faceted. Preferably, adjacent the outboard end portion 110, the outer surface 108 has a portion 112 which is of a hexagonal shape or nut shape. From the hexagonally-shaped portion 112, the outer surface 108 has a substantially constant diameter in an inboard direction toward the knuckle 12 until it gradually increases in diameter adjacent an inner rib 114 and an internal rib 116 of a hub cap 118.

The bolt 86 is fluid communication with the rotary joint spindle 46 via the rotary joint body 70. Preferably, the bolt 86 is of the banjo variety. The bolt 86 has an opening 120 adjacent the chamber 84 and a hollow body 122. The hollow body 122 comprises the inboard open end 104 and an outboard end 126. The hollow body 122 permits air to flow from the rotary joint spindle 46 and rotary joint body 70 through the bolt 86. The bolt 86 is at least partially disposed within the rotary joint body 70 and is concentric with a pressure relief valve 128, 128A. More particularly, the open end 104 is located within the rotary joint body 70. The rotary joint body 70 is concentric with the open end 104.

An aperture 130 is provided adjacent the outboard end 126 of the body 122. The aperture 130 allows the bolt 86 to communicate with a ring 132. The ring 132 has a nib 134 projecting from its exterior. Preferably, a hose 136 is attached to an outer surface of the nib 134 to allow fluid communication with ring 132. The hose 136 is in fluid communication with the bolt 86 via the ring 132. Preferably, the hose 136 is also in fluid communication with the wheel assembly. The hose 136 may be in fluid communication with the wheel assembly through other connections, joints and/or valves as required. When inflating, deflating or maintaining the tire pressure of the wheel assembly, a pressurized fluid such as, for example, air is directed through the knuckle air passage 32, spindle air passage 34, passage 52 in the rotary joint spindle 46, rotary joint body 70, bolt 86 and ring 132 to the hose 136 or vice versa.

The bolt 86 and at least a portion of the rotary joint body 70 are at least partially housed within an external rib 138 of the hub cap 118. The external rib 138 extends almost entirely circumferentially about the bolt 86 and a portion of the rotary joint body 70. A gap is provided in the external rib 138 to accommodate the hose 136 extending from the nib 134. The external rib 138 protects the bolt 86, ring 132, nib 134, and the connection of the hose 136 at the nib 134 from damage.

The hub cap 118 is attached to the hub 38. More particularly, a hub cap wall portion 142 is attached to the hub 38. The hub cap 118 extends radially and in a generally outboard direction from the hub 38. Both the hub cap 118 and hub 38 are constructed of a robust material such as, for example, steel.

The rotary joint body 70 is housed by the hub cap 118. The hub cap 118 also houses the rotary joint spindle 46 and at least a portion of the spindle 26. The hub cap 118 comprises the inner rib 114, internal rib 116 and external rib 138. In an embodiment, the inner rib 114, internal rib 116 and external rib 138 are formed in a unitary manner. In another embodiment, one or more of the inner rib 114, internal rib 116 and external rib 138 are formed as separate members. The inner rib 114, internal rib 116 and external rib 138 each house a portion of the rotary joint body 70. Preferably, at least a portion of the rotary joint body 70 is concentric with the inner rib 114, internal rib 116 and external rib 138. The hub cap 118 extends in a radial direction via the inner rib 114, in an inboard direction via the internal rib 116 and in an outboard direction via the external rib 138.

Figure 4:
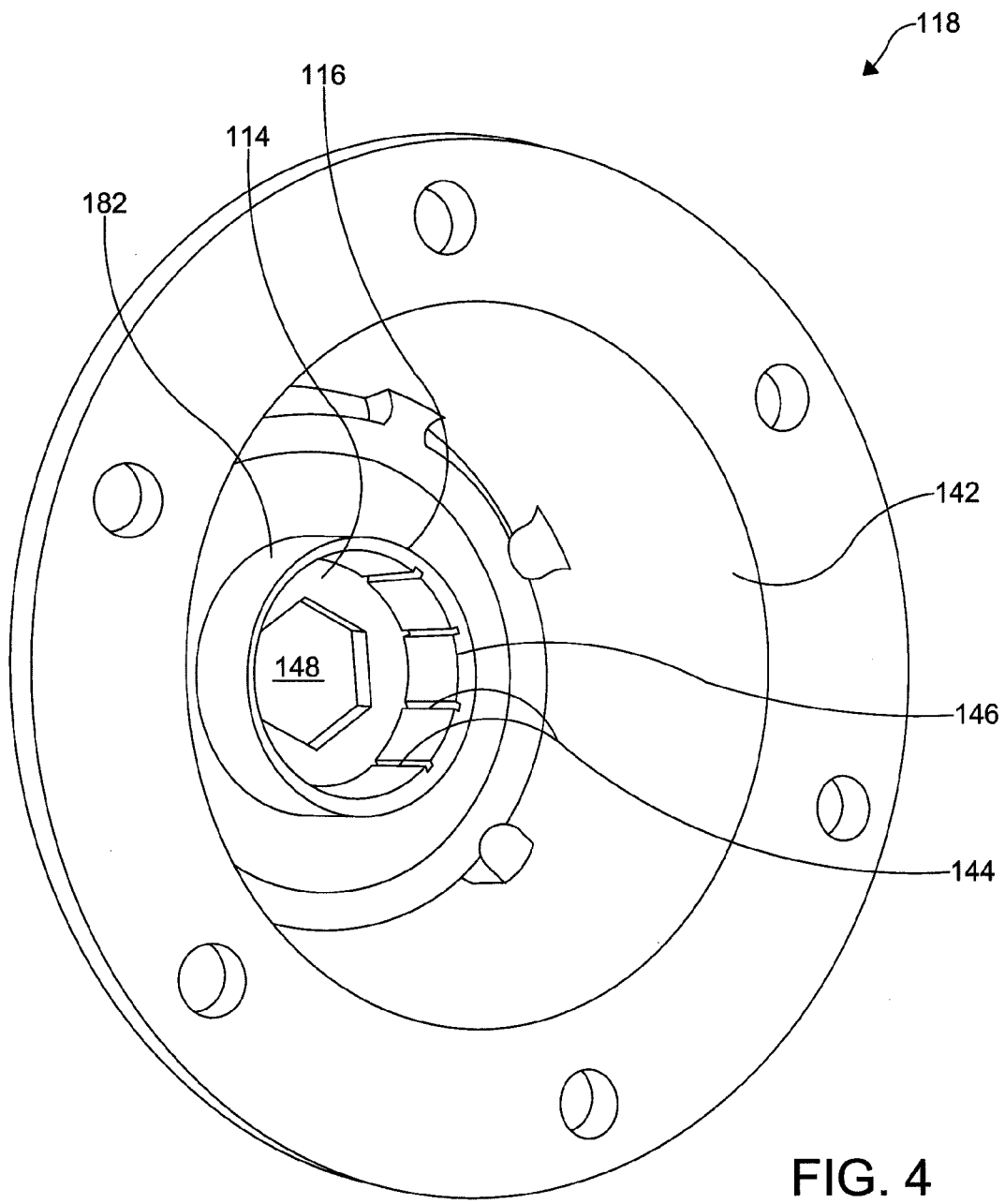
FIG. 4 is a perspective view of an embodiment of a hub cap suitable for use in the assembly of FIG. 1.

The internal rib 116 extends in a substantially opposite direction from the external rib 138. The figures depict the internal rib axially opposite the external rib, however, the ribs need not be so oriented. As shown best in FIG. 4, the internal rib 116 is annular and housed by a hub cap wall portion 142. A plurality of grooves 144 are formed in an inner surface 146 of the internal rib 116. In the depicted embodiments, the grooves 144 are the same size, shape and have the same depth. The grooves 144 are generally rectangular-shaped and preferably circumferentially and equally spaced apart. Preferably, each groove 144 extends axially across the inner surface 146 of the internal rib 116 to the inner rib 114. The grooves 144 are also oriented all in the same direction, namely, parallel to an axis of the body.

The inner rib 114 is attached to the internal rib 116 and external rib 138 and separates the ribs 116, 138 from each other. As noted above, the inner rib 114 extends in a radial direction and houses a portion of the rotary joint body 70. The inner rib 114 also houses a portion of the bolt 86. The inner rib 114 is an annular portion and defines a hole 148. It can be appreciated based on the foregoing components and design, that no torque is being transferred through the hose 148. Instead, any torque that is present is transferred through the connection of the rotary joint body 70 to the hub cap 118 via the hole 148 defined by the inner rib 114. Preferably, the hole 148 has a hexagonal shape. When the outer surface 108 of the rotary joint body 70 has a hexagonal shape, the outer surface 108 fits within the complimentary shaped hole 148.

The hub cap wall portion 142 is an annular portion and may be formed in a unitary manner with one or more of the ribs 114, 116, 138. Alternatively, the hub cap wall portion 142 may be formed as a separate member. Referring back to FIG. 3, the hub cap 118 houses a baffle 150. More particularly, the hub cap wall portion 142 houses the baffle 150. The baffle 150 is attached to the rotary joint body 70. The internal rib 114 is partially disposed between the baffle 150 and the outer surface 108 of the rotary joint body 70.

The baffle 150 may have a general L-shaped cross-section. The baffle 150 comprises a first leg 152 which is located adjacent and parallel to the internal rib 116. The baffle 150 also comprises a second leg 154 which may be located in a perpendicular relationship with the internal rib 116 and the outer surface 108 of the rotary joint body 70. It can be appreciated from the foregoing that in order to accommodate the internal rib 116 and the rotary joint body 70, the baffle 150 is a generally annular member with a hollow interior defined by the first leg 152 and second leg 154.

The pressure relief valve 128, 128A is disposed between the hub cap 118 and the rotary joint body 70. More particularly, the pressure relief valve 128, 128A is located in a cavity 156 formed between the inner rib 114, internal rib 116 and the rotary joint body 70. The pressure relief valve 128, 128A is separated from the rotary seal assembly 60 by the rotary joint body 70. However, it should be appreciated that the pressure relief valve 128, 128A may be utilized adjacent other portions of the tire inflation system or apart from the tire inflation system. The pressure relief valve 128, 128A selectively provides a seal between the hub cap 118 and the rotary joint body 70. More particularly, the pressure relief valve 128, 128A selectively provides a seal on an inboard surface 157 of the inner rib 114 and provides a seal on the outer surface 108 of the rotary joint body 70. By selectively providing a seal between the hub cap 118 and the rotary joint body 70, the pressure relief valve 128, 128A permits pressurized gas to escape from the hub 38, helps to prevent lubricant from escaping the hub 38 and prevents dirt and debris from entering the hub 38.

The pressure relief valve 128, 128A may be elastomeric and formed of a flexible material such as, for example, a polymer or rubber compound. In one embodiment, the pressure relief valve 128, 128A may be comprised of a 50 durometer rubber compound. While one rubber compound of a 50 durometer hardness has been disclosed, it can be appreciated that other materials with other hardness values may also be used.

The pressure relief valve 128, 128A is generally an annular member having a through hole 158 so that the pressure relief valve 128, 128A can be disposed around the outer surface 108 of the rotary joint body 70. More particularly, a first end portion 160 of the pressure relief valve 128, 128A sealingly contacts the hub cap 118 and a second end portion 162 of the pressure relief valve 128, 128A abuts the outer surface 108 of the rotary joint body 70. The through hole 158 has a first opening 164 adjacent the first end portion 160 and a second opening 166 adjacent the second opening 166 The through hole 158 extends between the first opening 164 and the second opening 166. The first opening 164 preferably has a substantially constant diameter and is defined by the first end portion 160. Also, the second opening 166 preferably has a constant diameter. In an embodiment like the one illustrated in FIGS. 5 and 6, the second opening 166 is defined by the second end portion 162. In this embodiment, the diameter of the second opening 166 is larger than the diameter of the first opening 164.

Figure 5:
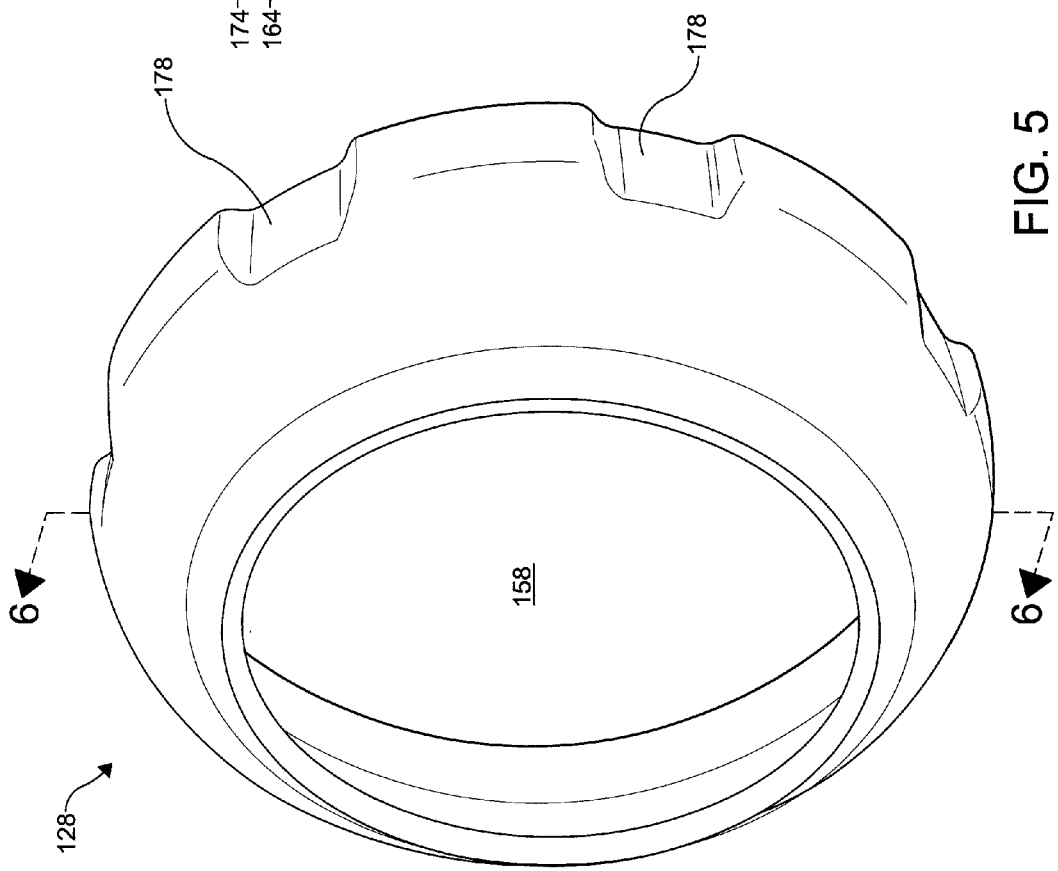
FIG. 5 is a perspective view of an embodiment of a pressure relief valve suitable for use in the assembly of FIG. 1.

Referring now to FIG. 5, the pressure relief valve 128 also comprises an outer surface 168 and an inner surface 170. The two surfaces 168, 170 are bounded by a first end 174 and a second end 176. The outer surface 168 and inner surface 170 extend in a continuous curvilinear fashion from the second end portion 162 to the first end portion 160. The two surfaces 168, 170 define between them a valve thickness. The valve thickness is greatest at the second end portion 162 and generally tapers down to the first end portion 160 where the valve thickness is the thinnest.

Figure 6:
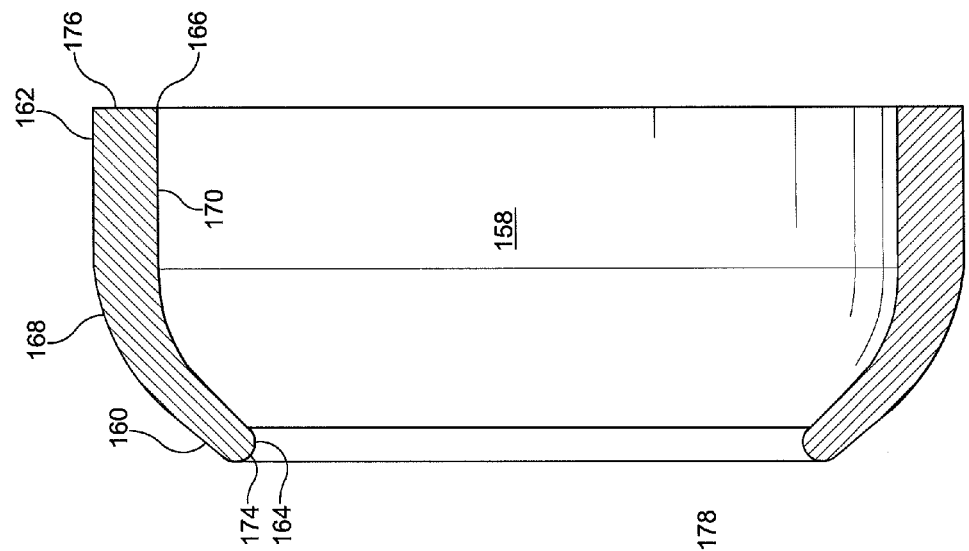
FIG. 6 is cross-sectional view of the pressure relief valve of FIG. 5 taken along line 6-6.

In an embodiment like the one shown in FIGS. 5 and 6, the inner surface 170 from the first opening 164 to the second opening 166 is a continuous, smooth surface. From the first opening 164 to the second opening 166, the inner surface 170 increases in diameter in a smooth, continuous curvilinear fashion. In another embodiment like the one shown in FIGS. 7 and 8, the inner surface 170 increases in diameter in a smooth, continuous curvilinear fashion to a rib portion 172.

Figure 8:
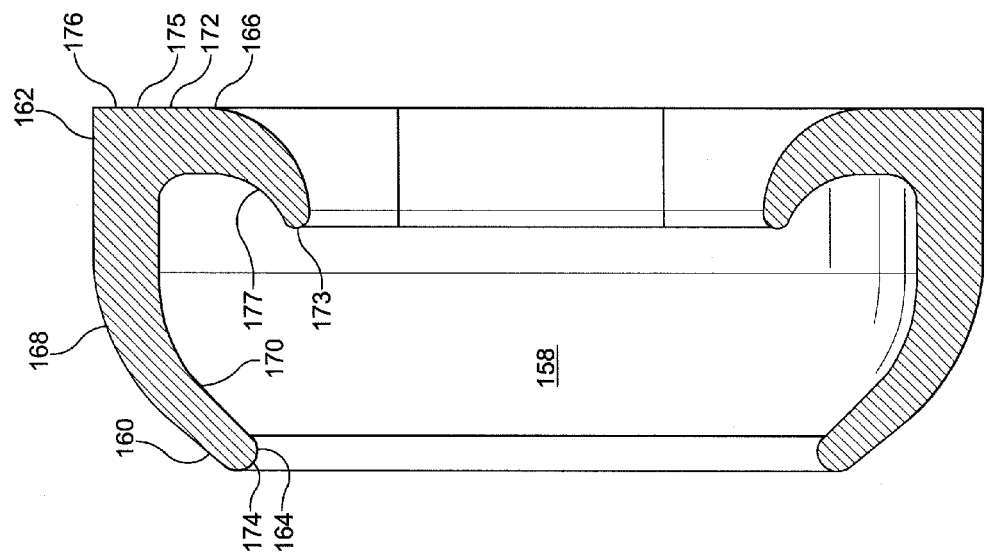
FIG. 8 is cross-sectional view of the pressure relief valve of FIG. 7 taken along line 8-8.
Figure 7:
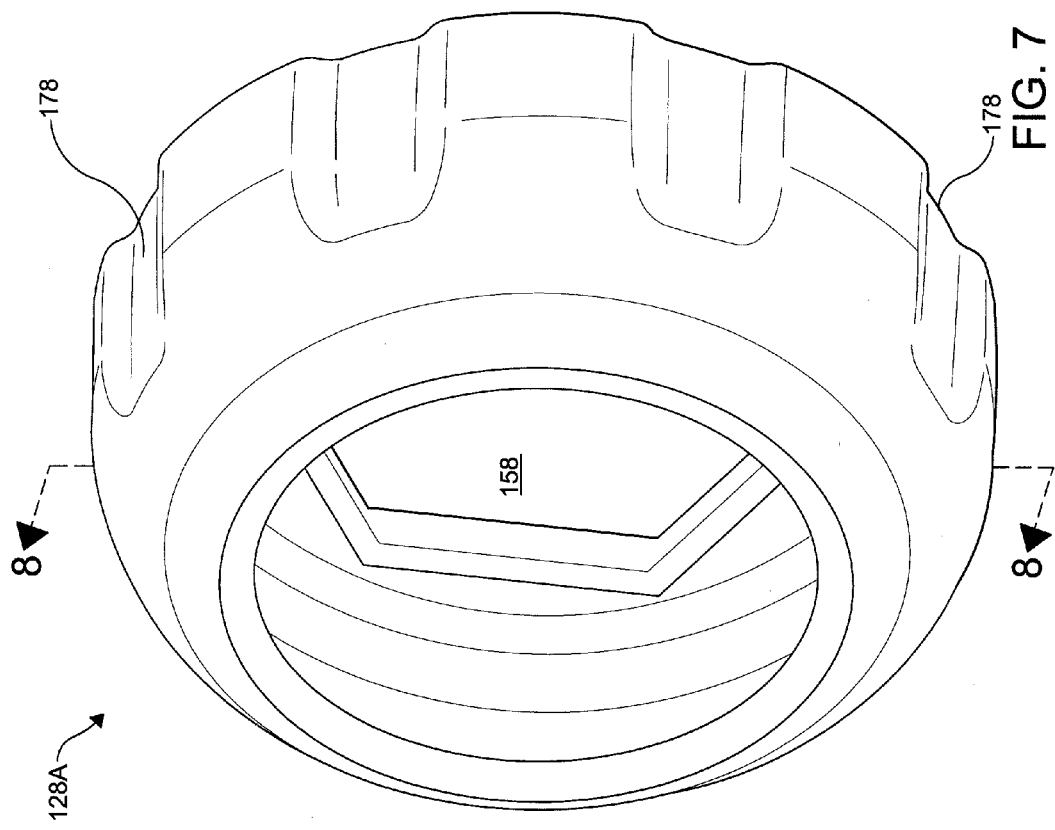
FIG. 7 is a perspective view of another embodiment of a pressure relief valve suitable for use in the assembly of FIG. 1.

In the embodiment illustrated in FIGS. 7 and 8, the rib portion 172 defines the second opening 166 and a portion of the through hole 158. In this embodiment, the inner surface 170 generally decreases in diameter in an outboard direction from the second opening 166 to an end 173 of the rib portion 172. From the end 173 of the rib portion 172, the through hole 158 increases in diameter to the second end portion 162. The inner surface 170 decreases in diameter adjacent the first end portion 160 from the second end portion 162.

The rib portion 172 is attached to the second end portion 162, decreases in thickness and extends radially and axially. The rib portion 172 comprises a portion 175 which extends radially toward the rotary joint body 70 from the second end portion 162 and a portion 177 which gradually decreases in thickness to the end 173 and extends axially in an outboard direction. As illustrated best in FIG. 3, the rib portion 172 is disposed on the outer surface 108 of the rotary joint body 70 and provides a seal thereon.

Referring back to FIG. 5, from the first end 174 to the second end 176, the outer surface 168 increases in diameter in a general curvilinear fashion. A plurality of grooves 178 are formed in the outer surface 168. More particularly, the grooves 178 are formed in the second end portion 162 and do change the thickness of the second end portion 162 in selective locations. The grooves 178 are separated from the rib portion 172 by the second end portion 162. Preferably, the grooves 178 are integrally formed and unitary with the valve body and are circumferentially and equally spaced apart about the second end portion 162. In the depicted embodiments, the grooves 178 are the same size, shape and have the same depth. The grooves 178 are also oriented in the same direction as each other and as the grooves 144 formed in the internal rib 116 of hub cap 118.

Each groove 178 comprises a depth which is greatest adjacent the second end 176. The depth of the grooves 178 gradually decreases from the second end 176. Between approximately one third to one half of the way from the second opening 166 to the first opening 164, the grooves 178 transition to the outer surface 168 which then extends from the grooves 178 to the first opening 164. The grooves 178 make their transition without interruption.

The curvilinear shape of the outer surface 168 and inner surface 170 and the taper from the second end portion 162 to the first end portion 160 plays a role in allowing the seal to be selectively provided between the hub cap 118 and the rotary joint body 70. More particularly, the curvilinear shape and the taper reduces contact pressure between the first end portion 160 of the pressure relief valve 128, 128A and the hub cap 118. The reduction in contact pressure is in part due to the pressure relief valve 128, 128A being more flexible adjacent the first end portion 160 because it is thinner there and because the first end portion 160 only has a small surface area in contact with the hub cap 118.

As noted above, the pressure relief valve 128, 128A permits pressurized gas to escape from the hub 38. In operation, pressurized gas within the hub 38 is received against the second end portion 162 of the pressure relief valve 128, 128A and inner surface 146 of the internal rib 116 of the hub cap 118. Pressurized gas may equally flow through the grooves 144 formed in the hub cap 118 and the grooves 178 formed in the pressure relief valve 128, 128A or it may flow through one or more grooves 144, 178 in unequal amounts or at different times. After flowing through the grooves 144, 178, the pressurized gas follows the outer surface 168 of the pressure relief valve 128, 128A toward the first end portion 160. At a predetermined pressure, the first end portion 160 is biased away from the hub cap 118 and flexes radially inward toward the rotary joint body 70. The bias may be at one or more discrete points at the first end portion 160 or substantially circumferentially about the first end portion 160 of the pressure relief valve 128, 128A. Pressurized gas is then permitted to escape past the first end portion 160 and the hub cap 118. Thus, the assembly 10 allows pressurized gas adjacent the assembly to be vented.

After venting some or all of the pressurized gas, the first end portion 160 then returns back to its original shape and orientation and the seal provided between the hub cap 118 and the rotary joint body 70 is restored. Preferably, the seal is restored before allowing lubricant contained in the hub 38 to escape. Therefore, the pressure relief valve 128, 128A also helps to prevent lubricant from escaping the hub 38.

The location of the pressure relief valve 128, 128A within a serpentine path 184 also helps to prevent lubricant within the hub 38 from escaping. The serpentine path 184 is provided in the assembly 10 to permit pressurized gas to escape as described above and also to restrict, or prevent, lubricant from escaping from the hub 38. Also, the serpentine path 184 helps to prevent dirt and debris from entering into the hub 38. The serpentine path 184 is described in detail below with reference to FIG. 3.

From within the hub 38, the serpentine path 184 begins in a space 180 between the hub cap 118 and baffle 150. Next, the serpentine path 184 extends to a gap between the end of the first leg 152 of the baffle 150 and the hub cap 118. The serpentine path 184 further extends between the first leg 152 of the baffle 150 and an outer surface 182 of the internal rib 116. The serpentine path 184 also extends around the end of the first leg 152 of the baffle 150. The serpentine path 184 continues between the inner surface 146 of the internal rib 116 and the rotary joint body 70 until it encounters the pressure relief valve 128, 128A as described above. The serpentine path 184 extends from the pressure relief valve 128, 128A to between the hole 148 formed in the inner rib 114 of the hub cap 118 and the outer surface 108 of the rotary joint body 70. Once the air passes through the rotary joint body 70 and the hole 148 it passes the external rib 138 of the hub cap 118 as it is released to the atmosphere.

The shape, taper and position of the pressure relief valve 128, 128A also function to resist external contaminants such as, for example, moisture and/or debris from entering the hub 38. More particularly, contaminants which attempt to enter the hub 38 are received against the inner surface 170 of the pressure relief valve 128, 128A. Contaminants received against the pressure relief valve 128, 128A push against the first end portion 160, which is directed radially inwardly, and biases the end portion 160 against the hub cap 118. When the first end portion 160 is being biased against the hub cap 118, the seal is maintained which prevents contaminants from entering the hub 38 via the hub cap 118.

In accordance with the provisions of the patent statutes, the present invention has been described in what is considered to represent its preferred embodiments. However, it should be noted that the invention can be practiced otherwise than as specifically illustrated and described without departing from its spirit or scope.

What we claim is:

1. An assembly for a tire inflation system, comprising:
a rotary joint spindle;
a rotary joint body rotatably disposed on and in fluid communication with the rotary joint spindle, the rotary joint body housed by a hub cap and provided adjacent an end of a spindle; and
a pressure relief valve disposed between the hub cap and the rotary joint body, wherein the pressure relief valve comprises a first end portion which sealingly contacts the hub cap and a second end portion which abuts an outer surface of the rotary joint body, the pressure relief valve selectively providing a seal between the hub cap and the rotary joint body.

2. The assembly of claim 1, further comprising a bolt at least partially disposed within the rotary joint body and in fluid communication with the rotary joint spindle via the rotary joint body.

3. The assembly of claim 1, wherein the rotary joint spindle is attached to the spindle and in fluid communication with a spindle air passage.

4. The assembly of claim 1, further comprising a rotary seal assembly which seals against and is disposed around a second outer diameter portion of the rotary joint spindle.

5. The assembly of claim 1, wherein the rotary joint spindle comprises a first outer diameter portion and a second outer diameter portion, the second outer diameter portion being of a diameter which is greater than that of the first outer diameter portion.

6. The assembly of claim 1, wherein the hub cap comprises an internal rib which is disposed between a baffle and the outer surface of the rotary joint body.

7. The assembly of claim 1, wherein the pressure relief valve is disposed around the outer surface of the rotary joint body.

8. The assembly of claim 1, wherein the second end portion has a plurality of circumferentially spaced grooves formed therein.

9. The assembly of claim 1, wherein the rotary joint body is rotatably disposed on the rotary joint spindle via a bearing.

10. The assembly of claim 1, wherein the pressure relief valve is elastomeric.

11. The assembly of claim 1, further comprising a pressurized gas which is directed between the outer surface of the rotary joint body and the hub cap, between an outer surface of the pressure relief valve and the hub cap and to the atmosphere.

12. The assembly of claim 1, further comprising a pressurized fluid which is directed through the rotary joint spindle, the rotary joint body and a banjo bolt to a hose attached to a ring in fluid communication with the banjo bolt.

13. The assembly of claim 1, further comprising a bearing which is separated from the end of the spindle by a spacer disposed around the rotary joint spindle.

14. The assembly of claim 4, wherein the rotary seal assembly seals against an inner surface of the rotary joint body.

15. The assembly of claim 4, wherein the rotary seal assembly comprises a groove and a circular spring located therein.

16. The assembly of claim 6, wherein a plurality of circumferentially spaced grooves which extend axially are formed in an inner surface of the internal rib.

17. The assembly of claim 8, wherein the pressure relief valve comprises a rib portion which extends radially in from the second end portion and is disposed on the outer surface of the rotary joint body.

18. An assembly for a tire inflation system, comprising:
a rotary joint spindle which is attached to a spindle and in fluid communication with a spindle air passage formed in the spindle;
a rotary joint body provided adjacent an end of the spindle and rotatably disposed on and in fluid communication with the rotary joint spindle;
a rotary seal assembly seals against an inner surface of the rotary joint body and is disposed around a second outer diameter portion of the rotary joint spindle;
a pressure relief valve separated from the rotary seal assembly by the rotary joint body and disposed between a hub cap and the rotary joint body, wherein the pressure relief valve comprises a first end portion which sealingly contacts the hub cap and a second end portion which abuts an outer surface of the rotary joint body, the pressure relief valve selectively providing a seal between the hub cap and the rotary joint body; and
a bolt concentric with the pressure relief valve and in fluid communication with the rotary joint spindle via a chamber formed in the rotary joint body.

19. The assembly of claim 18, wherein the bolt is also in fluid communication with a hose assembly via a ring which surrounds a portion of the banjo bolt.

20. The assembly of claim 18, wherein the pressure relief valve is elastomeric and the second end portion has a plurality of circumferentially spaced grooves formed therein.

\* \* \* \* \*